United States Patent
Helppi et al.

(10) Patent No.: US 10,082,439 B1
(45) Date of Patent: Sep. 25, 2018

(54) EVENT DEPICTION ON CENTER OF GRAVITY CURVE

(71) Applicant: Rockwell Collins, Inc., Cedar Rapids, IA (US)

(72) Inventors: Benjamin M. Helppi, Anamosa, IA (US); Douglas M. McCormick, North Liberty, IA (US); Marc Ayala, Robins, IA (US)

(73) Assignee: ROCKWELL COLLINS, INC., Cedar Rapids, IA (US)

( * ) Notice: Subject to any disclaimer, the term of this patent is extended or adjusted under 35 U.S.C. 154(b) by 0 days.

(21) Appl. No.: 15/268,355

(22) Filed: Sep. 16, 2016

(51) Int. Cl.
| | |
|---|---|
| *G01M 1/12* | (2006.01) |
| *B64D 37/00* | (2006.01) |
| *G08G 5/00* | (2006.01) |
| *B64D 45/00* | (2006.01) |
| *B64D 1/00* | (2006.01) |

(52) U.S. Cl.
CPC .............. *G01M 1/127* (2013.01); *B64D 1/00* (2013.01); *B64D 37/005* (2013.01); *B64D 45/00* (2013.01); *G08G 5/0039* (2013.01)

(58) Field of Classification Search
CPC .................................................. G01M 1/125
USPC .................... 701/3, 120, 124, 34.2; 244/7 R
See application file for complete search history.

(56) References Cited

U.S. PATENT DOCUMENTS

| | | | | |
|---|---|---|---|---|
| 5,727,161 A | * | 3/1998 | Purcell, Jr. ............ | G06F 17/246 705/30 |
| 6,913,228 B2 | * | 7/2005 | Lee ......................... | B64C 30/00 244/135 C |
| 7,668,629 B2 | * | 2/2010 | DiEsposti ................ | B64G 3/00 342/357.29 |

(Continued)

FOREIGN PATENT DOCUMENTS

| | | | | |
|---|---|---|---|---|
| CA | 2908282 A1 | * | 4/2016 | ............. G09B 9/301 |
| EP | 1697210 A4 | * | 2/2009 | ........... B64C 1/0009 |

(Continued)

OTHER PUBLICATIONS

Autonomous deployment of the UAVSAR radar instrument; Kenneth Vines; Roger Chao; 2010 IEEE Aerospace Conference Year: 2010; pp. 1-8, DOI: 10.1109/AERO.2010.5446698.*

(Continued)

*Primary Examiner* — Cuong H Nguyen

(74) *Attorney, Agent, or Firm* — Donna P. Suchy; Daniel M. Barbieri

(57) ABSTRACT

A system for monitoring the center of gravity of an aircraft includes receiving flight plan information regarding a flight plan of an aircraft indicative of planned events to occur during operation of the aircraft; predicting a center of gravity of the aircraft during operation of the aircraft based on the flight plan information; plotting a center of gravity curve based on the predicted center of gravity of the aircraft on a display, the center of gravity curve including a plurality of markers, each marker corresponding to one of the planned events, the location of each marker on the center of gravity (Continued)

curve indicating when during the operation of the aircraft the event is planned to occur, one of the events indicating an in-flight event; and updating the plotted center of gravity curve in real-time during operation of the aircraft based on an actual center of gravity of the aircraft.

20 Claims, 6 Drawing Sheets

(56) References Cited

U.S. PATENT DOCUMENTS

| | | | | |
|---|---|---|---|---|
| 8,275,516 | B2* | 9/2012 | Murphy | A01B 69/00 701/124 |
| 8,359,542 | B2* | 1/2013 | Dingeman | G06F 17/5095 701/14 |
| 8,366,055 | B2* | 2/2013 | Ulrich | B64C 39/024 244/17.11 |
| 8,412,392 | B2* | 4/2013 | Jayathirtha | G05D 1/0676 701/14 |
| 8,453,961 | B2* | 6/2013 | Lugg | B64C 30/00 244/1 N |
| 9,464,958 | B2* | 10/2016 | Shue | G01M 1/127 |
| 9,542,851 | B1* | 1/2017 | Kim, II | G08G 5/0047 |
| 9,702,674 | B2* | 7/2017 | Fairfax | F42B 10/26 |
| 2008/0133135 | A1* | 6/2008 | DiEsposti | B64G 3/00 701/13 |
| 2009/0003668 | A1* | 1/2009 | Matsumoto | A61B 5/055 382/128 |
| 2012/0286102 | A1* | 11/2012 | Sinha | B64C 15/00 244/7 B |
| 2014/0331748 | A1* | 11/2014 | Watanabe | G01M 1/122 73/65.01 |
| 2014/0339354 | A1* | 11/2014 | Gaillimore | B64C 39/12 244/12.4 |
| 2015/0048215 | A1* | 2/2015 | McGinnis | B64C 9/00 244/90 R |
| 2016/0209290 | A1* | 7/2016 | Shue | G01M 1/127 |
| 2016/0349026 | A1* | 12/2016 | Fairfax | F42B 10/26 |

FOREIGN PATENT DOCUMENTS

| | | | | |
|---|---|---|---|---|
| EP | 2337005 | A1 * | 6/2011 | G09B 9/00 |
| EP | 2411972 | A2 * | 2/2012 | G05D 1/101 |
| WO | WO 2008127854 | A2 * | 10/2008 | B64C 9/12 |
| WO | WO 2010022484 | A1 * | 3/2010 | B64C 17/10 |

OTHER PUBLICATIONS

Vital—an advanced time-based tool for the future 4D ATM environment; H. Hering; The 23rd Digital Avionics Systems Conference (IEEE Cat. No. 04CH37576); Year: 2004, vol. 1; pp. 3.B.5-3.1-8 vol. 1, DOI: 10.1109/DASC.2004.1391294.*
Path planning using 3D Dubins Curve for Unmanned Aerial Vehicles; Yucong Lin; Srikanth Saripalli; 2014 International Conference on Unmanned Aircraft Systems (ICUAS); Year: 2014; pp. 296-304, DOI: 10.1109/ICUAS.2014.6842268.*
Real-time knowledge-based support for air traffic management; U. R. Schlatter; IEEE Expert ; Year: 1994, vol. 9, Issue: 3 pp. 21-24, DOI: 10.1109/64.311275.*
Robust longitudinal flight control system under weight and center of gravity uncertainty; K. Hentabli; O. Akhrif; L. Saydy CCECE 2003—Canadian Conference on Electrical and Computer Engineering. Toward a Caring and Humane Technology (Cat. No. 03CH37436); Year: 2003, vol. 3; pp. 1743-1748 vol. 3, DOI: 10.1109/CCECE.2003.1226247.*
Relative visual-inertial odometry for fixed-wing aircraft in GPS-denied environments; Gary Ellingson; Kevin Brink; Tim McLain; 2018 IEEE/ION Position, Location and Navigation Symposium (PLANS); pp. 786-792. (Year: 2018).*
Deriving Streaming Graph Algorithms from Static Definitions; David Ediger; James P. Fairbanks2017 IEEE International Parallel and Distributed Processing Symposium Workshops (IPDPSW)Year: 2017; pp. 637-642. (Year: 2017).*
Design of aircraft center of gravity control law based on sliding mode control; Jianing Yan; Jing Zhang; Haiquan Li2016 IEEE International Conference on Aircraft Utility Systems (AUS); pp. 438-442. (Year : 2016).*
Effects of partial fuel pump failure on center of gravity control for high-speed aircraft Haiquan Li; Jing Zhang; Jianing Yan; 2016 IEEE International Conference on Aircraft Utility Systems (AUS); pp. 146-150. (Year: 2016).*

* cited by examiner

EVENT DEPICTION ON CENTER OF GRAVITY CURVE

BACKGROUND

The inventive concepts disclosed herein relate generally to the field of aircraft instrumentation systems. More particularly, embodiments of the inventive concepts disclosed herein relate to a center of gravity envelope display for an aircraft.

A center of gravity of an aircraft affects the stability of the aircraft. Every aircraft is operationally limited by its center of gravity. For any particular aircraft to be controlled by a pilot and operated safely, the aircraft must operate such that its center of gravity falls within longitudinal and lateral center of gravity limits, otherwise referred to a center of gravity envelope. If at any time during flight the center of gravity of an aircraft shifts beyond its center of gravity envelope, controlling the aircraft may become more difficult. Or worse, the aircraft may not be able to be controlled to maintain a significant enough pitch to experience lift and stay airborne. Accordingly, when an aircraft is airborne, the center of gravity of the aircraft must remain within the center of gravity envelope in order for the aircraft to operate as intended.

Many aircraft are equipped with a display for displaying the center of gravity of the aircraft with respect to the center of gravity envelope so that aircraft crew members can monitor the center of gravity of the aircraft to ensure the center of gravity of the aircraft stays within the envelope. A center of gravity curve may be overlaid on the center of gravity display indicating a predicted center of gravity of the aircraft along a flight path.

SUMMARY

In one aspect, the inventive concepts disclosed herein are directed to a system for monitoring the center of gravity of an aircraft that includes at least one processor coupled with a non-transitory processor-readable medium storing processor-executable code. The processor-executable code causes the processor to receive flight plan information regarding a flight plan of an aircraft. The flight plan information is indicative of a plurality of planned events to occur during operation of the aircraft. The processor-executable code further causes the processor to predict a center of gravity of the aircraft during operation of the aircraft based on the flight plan information, and plot a center of gravity curve based on the predicted center of gravity of the aircraft during operation of the aircraft on a display. The center of gravity curve includes a plurality of markers and each marker corresponds to one of the planned events. The location of each marker on the center of gravity curve indicates when during the flight the event is planned to occur and at least one of the events indicates an in-flight event. The processor-executable code further causes the processor to update the plotted center of gravity curve in real-time during operation of the aircraft based on an actual center of gravity of the aircraft In a further aspect, the inventive concepts disclosed herein are directed to a method. The method includes receiving flight plan information regarding a flight plan of an aircraft. The flight plan information is indicative of a plurality of planned events to occur during operation of the aircraft. The method further includes predicting a center of gravity of the aircraft during operation of the aircraft based on the flight plan information, and plotting a center of gravity curve based on the predicted center of gravity of the aircraft during operation of the aircraft on a display. The center of gravity curve includes a plurality of markers and each marker corresponds to one of the planned events. The location of each marker on the center of gravity curve indicates when during the flight the event is planned to occur and at least one of the events indicates an in-flight event. The method further includes updating the plotted center of gravity curve in real-time during operation of the aircraft based on an actual center of gravity of the aircraft.

In a further aspect, the inventive concepts disclosed herein are directed to a system for monitoring the center of gravity of an aircraft. The system includes at least one processor coupled with a non-transitory processor-readable medium storing processor-executable code for causing the at least one processor to receive flight plan information regarding a flight plan of an aircraft. The flight plan information is indicative of a plurality of planned events to occur during operation of the aircraft. The processor-executable code further causes the processor to predict a center of gravity of the aircraft during operation of the aircraft based on the flight plan information, and to plot a center of gravity curve based on the predicted center of gravity of the aircraft during operation of the aircraft on a display. The center of gravity curve includes a plurality of markers, and each marker corresponds to one of the planned events. The location of each marker on the center of gravity curve indicates when during the flight the event is planned to occur, and at least one of the events indicates an in-flight event. Plotting the center of gravity curve includes overlaying the center of gravity curve on a center of gravity envelope of the aircraft. The center of gravity envelope is based on at least one characteristic of the aircraft and specifies recommended operational center of gravity limitations for the aircraft.

BRIEF DESCRIPTION OF THE DRAWINGS

Implementations of the inventive concepts disclosed herein may be better understood when consideration is given to the following detailed description thereof. Such description makes reference to the included drawings, which are not necessary to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION

Figure 1:
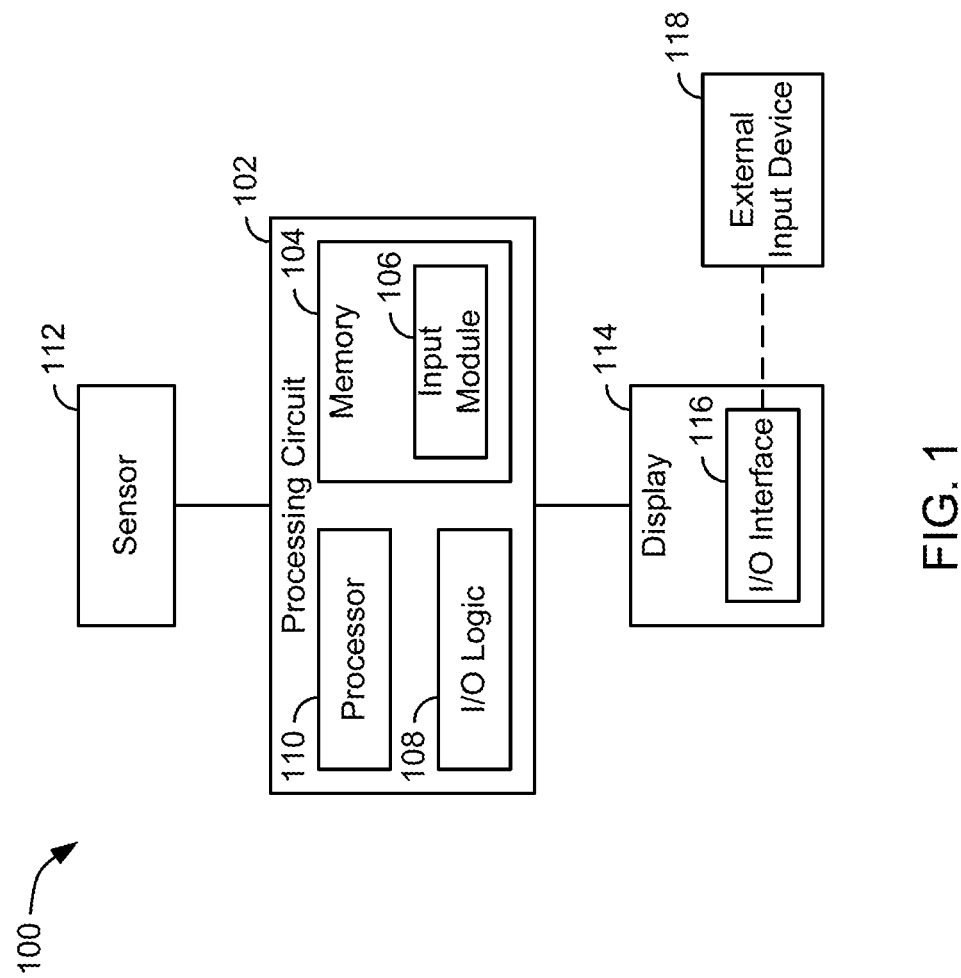
FIG. 1 is a block diagram of an exemplary embodiment of a center of gravity monitoring system according to the inventive concepts disclosed herein.
Figure 2:
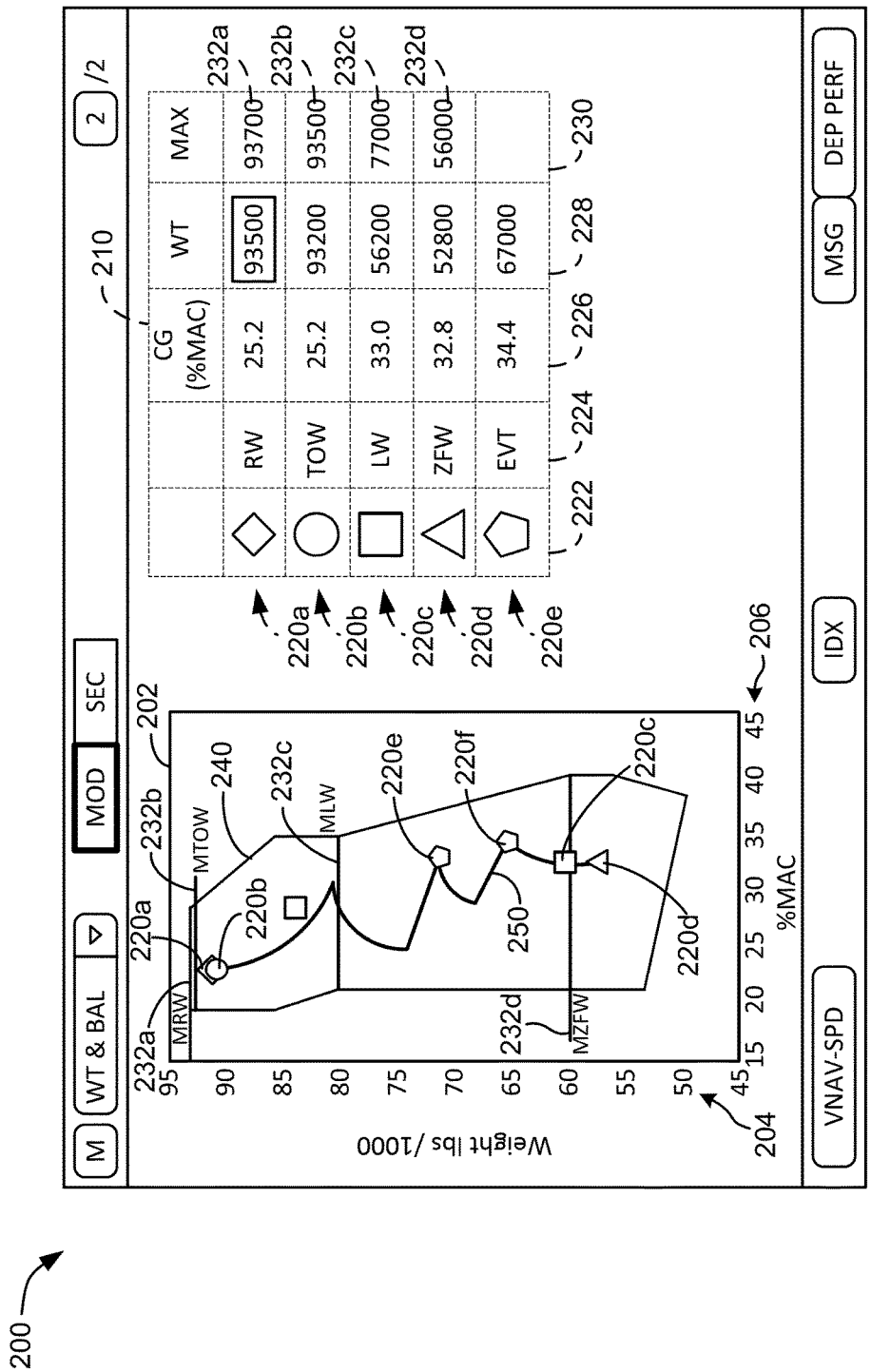
FIG. 2 is an illustration of an exemplary embodiment of a display screen of the center of gravity monitoring system of FIG. 1.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination or sub-combination of two or more such features, along with any other features which may not necessarily be expressly described or inherently present in the instant disclosure.

Broadly, embodiments of the inventive concepts disclosed herein are directed to event depiction on center of gravity curves. The inventive concepts disclosed herein can be utilized in at least one control system for various types of applications, sensing systems, and display systems. While the present disclosure describes systems and methods implementable in a cockpit of an aircraft, the inventive concepts disclosed herein may be used in a head-worn display for a pilot of an aircraft or any type of environment (e.g., in another aircraft, a spacecraft, a ground-based vehicle, or in a non-vehicle application such as a ground-based display system, an air traffic control system, a radar system, a virtual display system). While certain examples and embodiments of the inventive concepts disclosed herein are described with respect to a pilot of an aircraft, it will be appreciated that users other than a pilot may use and benefit from the inventive concepts disclosed herein with respect to other vehicles or and objects.

Referring now to FIG. 1, a center of gravity monitoring system 100 is shown according to the inventive concepts disclosed herein. The center of gravity monitoring system 100 includes a processing circuit 102, a memory 104, an input module 106, an input/output (I/O) logic 108, a processor 110, a sensor 112, a display 114, and an I/O interface 116. In some embodiments, the center of gravity data system 100 further includes an external input device 118.

The center of gravity monitoring system 100 is used to assist a pilot (e.g., user) or crew member of an aircraft (e.g., helicopter, jet, plane, drone, unmanned aerial vehicle) in monitoring the center of gravity of an aircraft and maintaining the center of gravity of the aircraft within an acceptable range, referred to herein as a center of gravity envelope. In application, the center of gravity monitoring system 100 displays the center of gravity envelope and a predicted center of gravity curve which is determined based on several center of gravity reference points (e.g., waypoints, checkpoints). The center of gravity reference points represent flight events that are expected to occur during a flight of the aircraft and where the center of gravity of the aircraft is calculated for based on fuel consumption up to that point of the flight. The events may be added to the center of gravity monitoring system 100 by a pilot before takeoff of the aircraft. For example, if the pilot expects to offload a certain amount of cargo at a particular waypoint, the pilot may input the planned offload of cargo when inputting the flight plan. In one embodiment, the event is added by first sending an event indication to the center of gravity monitoring system 100. In some situations, the event indication is sent by the pilot while in other situations the event indication is sent by a component of the aircraft such as a processing circuit or a sensor. The event indication may prompt the pilot to enter information relating to the event. The aircraft may automatically or semi-automatically enter the information relating to the event. During flight, the center of gravity monitoring system 100 may be updated to reflect changes in the flight of the aircraft that affect fuel consumption and therefore the expected center of gravity at a particular reference point. Changes during the flight of the aircraft may cause the predicted center of gravity curve to not be maintained within the center of gravity envelope. Using the predicted center of gravity curve, the pilot can determine which, if any, of the center of gravity reference points will fall outside of the center of gravity envelope, and then adjust an operation parameter of the aircraft (e.g., change a fuel burn pattern) or a detail regarding the event itself prior to an occurrence of the event.

The processing circuit 102 includes the memory 104, the input/output (I/O) logic 108, and the processor 110. The processing circuit 102 is communicable with the sensor 112 and the display 114. The sensor 112 is configured to obtain actual center of gravity data (e.g., sensor data) of the aircraft. The center of gravity data may include information relating to BOW CG, cargo, fuel weights, and cargo and fuel arms. The sensor 112 may be representative of a sensor array for the aircraft including at least one sensor. The processor 110 may be implemented as a specific purpose processor, an application specific integrated circuit (ASIC), one or more field programmable gate arrays (FPGAs), a group of processing components, or other suitable electronic processing components. The memory 104 is one or more devices (e.g., RAM, ROM, flash memory, hard disk storage) for storing data and computer code for completing and facilitating the various user or client processes, layers, and modules described in the present disclosure. The memory 104 may be or include volatile memory or non-volatile memory and may include database components, object code components, script components, or any other type of information structure for supporting the various activities and information structures of the inventive concepts disclosed herein. The memory 104 is communicably connected to the processor 110 and includes computer code or instruction modules for executing one or more processes described herein.

The memory 104 includes various modules that cause the processor 110 to execute the systems and methods described herein. The memory 104 includes an input module 106 configured to cause the center of gravity monitoring system 100 to receive center of gravity data from the sensor 112 via the I/O logic 108. The center of gravity data may include information relating to the aircraft, such as characteristics or specifications of the aircraft. The input module 106 may be configured to cause the center of gravity monitoring system 100 to combine, separate, and modify the received center of gravity data for processing by the processor 110 as described further below.

The memory 104 may be configured to store configuration data for the aircraft. The configuration data may include the location of at least one fuel tank, cargo bay, personnel compartment, munition, and ballast (e.g., a ballast bag). The configuration data may also include an amount of fuel, munitions, personnel, and ballasts. Further, the configuration data may include aerodynamic characteristics and properties of the aircraft.

In operation, the processing circuit 102 receives center of gravity data (e.g., center of gravity measurement) from the sensor 112. The center of gravity data may be used by the processing circuit 102 to determine an actual center of gravity of the aircraft at any given time. For example, the processing circuit 102 may be configured to determine an actual center of gravity of the aircraft by adding BOW CG, cargo, and fuel weights, and multiplying the sum by the sum of the cargo and fuel arms). In some embodiments, the processing circuit 102 utilizes the configuration data to determine the center of gravity envelope and the actual center of gravity with respect to the center of gravity envelope. In some embodiments, the processing circuit 102 receives the center of gravity data and utilizes the configuration data to determine the expected center of gravity of the aircraft for each reference point.

In one example, the sensor 112 may include a fuel sensor configured to determine an amount of fuel in a fuel tank of the aircraft and an amount of fuel burned by the aircraft. The sensor is configured to output fuel data to the processing circuit 102, which analyzes the center of gravity data and the fuel data to determine a predicted center of gravity of the aircraft during the course of operation. In some embodiments, the processing circuit 102 uses the center of gravity reference points to determine a predicted center of gravity curve. In some embodiments, the center of gravity envelope, which is based on specifications of the aircraft, and the predicted center of gravity curve are displayed together on the display 114.

The display 114 includes the I/O interface 116 for communicating with the processing circuit 102. According to various embodiments, the display 114 is configured to receive input from the pilot to interact with the center of gravity monitoring system 100. For example, the display 114 may be a touch screen. However, in some embodiments, the external input device 118 is communicable with the display 114. For example, the external input device 118 may be a joystick with buttons, a button, a dial, or a keyboard. In some applications, the pilot may use the external input device 118 to make selections on the display 114. For example, the external input device 118 may be an I/O interface that allows the pilot to interact with the center of gravity monitoring system. In some embodiments, the display 114 is a heads-up display (HUD) or helmet-mounted display (HMD).

In some embodiments, the center of gravity reference points include a maximum ramp weight (RW), a maximum take-off weight (TOW), a maximum landing weight (LW), a maximum zero fuel weight (ZFW), and at least one event weight (EVT). Some of the center of gravity reference points may be entered and/or edited by the pilot. For example, according to an exemplary embodiment, the events may be added by the pilot (e.g., when inputting a flight plan prior to takeoff). Initially, a computation of the center of gravity of the aircraft during the planned flight of the aircraft occurs before takeoff (e.g., pre-flight). However, the processing circuit 102 may continue to compute the predicted center of gravity curve during flight of the aircraft such that the predicted center of gravity curve is continuously updated, modified, or confirmed in real-time. In some embodiments, the processing circuit 102 only computes the predicted or actual center of gravity of the aircraft during specific portions of the flight (e.g., during take-off, at waypoints, at or near event locations) or according to a target time schedule (e.g., every thirty seconds, every five minutes).

The center of gravity reference points, including any inflight events, and the center of gravity envelope can be plotted on a plot for display on the display 114. In some embodiments, the plot tracks weight of the aircraft against the percentage of the mean aerodynamic chord (% MAC) of the aircraft. In some embodiments, the percentage of the mean aerodynamic chord is a measurement closely corresponding to a position of the center of gravity of the aircraft.

Using the center of gravity reference points, the processing circuit 102 determines a predicted center of gravity curve. The predicted center of gravity curve illustrates a predicted center of gravity of the aircraft as the weight of the aircraft changes from take-off until landing. Various symbols may be overlaid along the predicted center of gravity curve illustrating a position of a center of gravity reference point along the predicted center of gravity curve. The shape of the predicted center of gravity curve reflects a flight plan and characteristics of the flight plan. For example, the flight plan may call for a first fuel burn pattern to occur during a first stage of the flight and a second fuel burn pattern to occur during a second stage of the flight. Following this example, the predicted center of gravity curve may be different during the first stage versus during the second stage. In some embodiments, the processing circuit is configured to alter various characteristics of the aircraft such as the fuel burn pattern to ensure that the predicted center of gravity curve is maintained within the center of gravity envelope at all times during the course of the flight.

In addition to the plot of the predicted center of gravity curve, the display 114 also depicts a table including the center of gravity reference points. In some embodiments, the table utilizes a row and column layout where each row corresponds to one center of gravity reference point. The columns indicate a symbol and abbreviation for the center of gravity reference points as well as associated numerical values and any constraints. In other words, the table provides information relating to the center of gravity reference points. Depending on the application, any number of center of gravity reference points may be displayed in the table. For example, in some embodiments, only inflight events may be displayed in the table. The table may be deactivated by the pilot such that the plot occupies a larger portion of the display 114.

Depending on the flight plan, events may be added to the center of gravity reference points during flight or prior to takeoff. The events and characteristics of the events can be added via the I/O interface 116 and the external input device 118. The event characteristics are indicative of how the center of gravity of the aircraft will be affected during flight, such as a weight and an arm of the weight (e.g., a distance from a location of the weight to the center of gravity of the aircraft) for an item to be deployed during flight. For example, events may include the collection and deployment of cargo, personnel, and equipment as the weight from such events affect the center of gravity of the aircraft. Furthermore, events may also be based on fuel drops and an inflight refueling (e.g., aircraft-to-aircraft refueling). The events may be numerically defined by event characteristics. The event characteristics may be a change in weight of the aircraft and a location at which that change in weight occurs. For example, for a personnel deployment, the weight of the personnel and the location of the personnel in the aircraft prior to deployment may constitute event characteristics. The characteristics of the events added to the center of gravity reference points prior to take-off are used to determine the predicted center of gravity curve of the aircraft.

During the flight of the aircraft, the flight plan may change (e.g., the pilot may change a course of flight, a destination, or a target) and inflight events may be added or removed (e.g., via an update to the flight plan). In these situations it may be desirable to update the information being displayed to the pilot by the center of gravity monitoring system 100 based on an updated flight plan. During flight, the pilot may interact with the display 114 to remove events, change the event characteristics of an event (e.g., weight, waypoint, cargo bay used for deployment), or add new events (e.g., a second cargo or personnel deployment waypoint). When adding new events or removing events, before or during flight, the display 114 may indicate that the predicted center of gravity curve is not maintained within the center of gravity envelope (e.g., the center of gravity curve moves outside of the center of gravity envelope). In such a situation, the pilot may use the display 114 to alter the event characteristics such that the predicted center of gravity curve is maintained within the center of gravity envelope. In this way, the center of gravity monitoring system 100 facilitates real-time monitoring of the center of gravity of the aircraft during all stages of flight allowing the pilot to ensure desirable operation of the aircraft.

Conventional mechanisms for determining the center of gravity of an aircraft cannot account for events that are determined on a flight plan to flight plan basis. For example, conventional mechanisms cannot account for personnel or cargo deployment during the flight of an aircraft. Similarly, conventional mechanisms do not allow for adding, removing, or editing events during flight of the aircraft. As a result of these shortcomings, aircraft equipped with conventional center of gravity mechanisms may operate in an undesirable manner because the center of gravity of the aircraft may not be maintained within the center of gravity envelope of the aircraft.

Referring now to FIGS. 2-5, a display screen 200 is shown on the display 114 for the center of gravity monitoring system 100 according to the inventive concepts disclosed herein. The display 114 includes a plot 202 and a table 210. The plot includes a vertical axis 204 and a horizontal axis 206. According to various embodiments, the vertical axis 204 corresponds to a weight of the aircraft and the horizontal axis 206 corresponds to the center of gravity of the aircraft represented in terms of the percent mean aerodynamic chord (% MAC). The plot 202 and table 210 are used to display the center of gravity reference points 220a-220f, otherwise referred to herein as indicators or markers. The center of gravity reference points 220a-220f (e.g., waypoints, checkpoints) are associated with events 220e and 220f where the weight of the aircraft and center of gravity is known based on the amount of fuel expected to be expended until the specific event is planned to occur. The events 220e and 220f correspond to event characteristics of events that affect the center of gravity of an aircraft. In some embodiments, planned events 220e and 220f may be entered by an aircraft crew member before take-off of the aircraft or during flight. The events 220e and 220f may be entered after the system receives an event notification (e.g., from an aircraft sensor or inputted by the pilot). The event notification may be indicative of characteristics that define a change in the center of gravity of the aircraft, such as a change in weight and an arm (e.g., a distance from a location of the weight to the center of gravity of the aircraft) at which the change occurs. Each center of gravity reference point 220a-220f may be represented in the table 210 by an icon 222, an abbreviation 224 (e.g., an acronym, description), a center of gravity location 226, and a weight 228 of the aircraft at a time of the event.

Some center of gravity reference points 220a-220f are represented in the table 210 by a maximum weight 230. Specifically, the maximum weights 230 include a maximum ramp weight (MRW) 232a, a maximum take-off weight (MTOW) 232b, a maximum landing weight (MLW) 232c, and a maximum zero fuel weight (MZFW) 232d. As shown in the plot 202, the maximum ramp weight 232a, the maximum take-off weight 232b, the maximum landing weight 232c, and the maximum zero fuel weight 232 represent horizontal lines across a center of gravity envelope 240. These horizontal lines represent maximum weights for safe operation of the aircraft. For example, the maximum weights are weight that the corresponding center of gravity reference point 220a-220d should be maintained under to ensure desirable flight characteristics of the aircraft and safe operation of the aircraft. In some applications, the maximum weights 230 may help the pilot to operate the aircraft according to the flight plan. For example, the pilot can make sure that the aircraft has burned enough fuel such that the weight of the aircraft is below the maximum landing weight 232c before attempting to land the aircraft.

Using the inputted flight plan and center of gravity reference points 220a-220f, the processing circuit 102 predicts a center of gravity curve 250 for the aircraft that indicates a predicated center of gravity of the aircraft during operation. In some embodiments, the predicted center of gravity curve 250 is a prediction of the center of gravity of the aircraft throughout an entire flight of the aircraft (e.g., from takeoff to landing, from taxiing prior to takeoff to landing). The predicted center of gravity curve 250 intersects each of the center of gravity reference points 220-220f The pilot can utilize the predicted center of gravity curve 250 to make a determination regarding whether the center of gravity of the aircraft is maintained within the center of gravity envelope 240. According to various embodiments, the center of gravity reference points 220a-220f are selectable by the pilot via a touchscreen input function (e.g., configured to be selected by the pilot). Selection of one of the center of gravity reference points 220a-220f causes the display to display additional information related to the center of gravity reference point 220a-220f, such as on a menu or dashboard (e.g., to show a current weight of the aircraft, to enable the pilot to modify the flight plan, to enable the pilot to alter a fuel burn pattern). In some embodiments, the center of gravity reference points 220a-220f may be selectable and modifiable via the table 210. In some embodiments, the events 220e and 220f can be entered into the center of gravity monitoring system 100 after the events 220e and 220f have already occurred such that the pilot can visualize the center of gravity of the aircraft over the course of the flight.

In some applications, the processor 110 causes the display 114 to update the plotted center of gravity curve in real-time during operation of the aircraft based on an actual center of gravity of the aircraft. The updated center of gravity curve 250 replaces predicted portions of the center of gravity curve 250. In some embodiments, the display 114 displays an actual center of gravity curve along with the predicted center of gravity curve 250 such that a pilot or aircraft crew member is able to visualize whether and to what extent the actual center of gravity curve deviates from the flight plan. In some embodiments, the predicted center of gravity curve 250 is only computed and displayed at critical points, such as near or at events (e.g., the events 220e and 220f).

Figure 3:
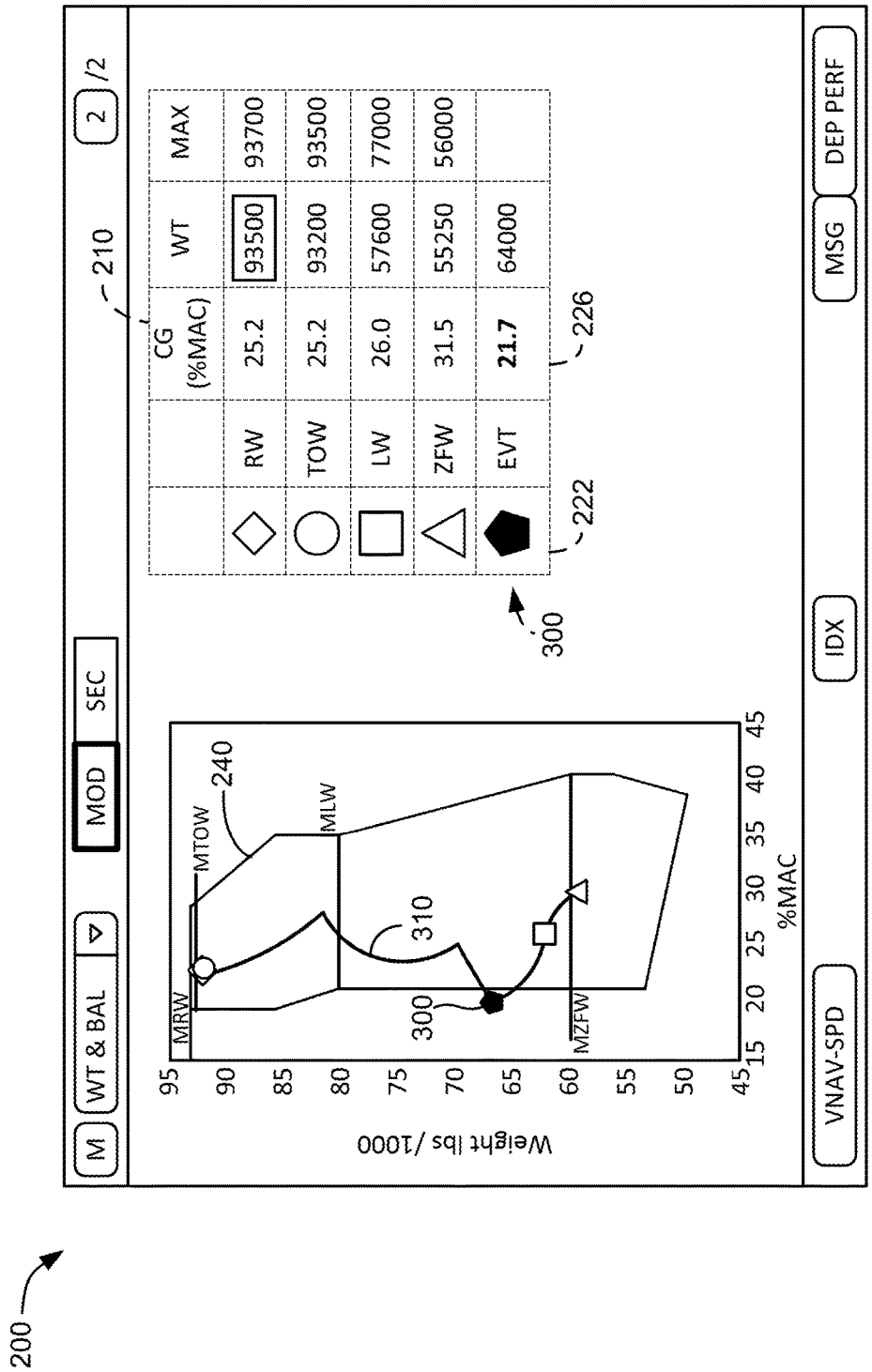
FIG. 3 is an illustration of another exemplary embodiment of a display screen of the center of gravity monitoring system of FIG. 1 having an updated center of gravity curve.

Referring specifically to FIG. 3, an illustration of an exemplary embodiment of the center of gravity monitoring system 100 including an event 300 and having an updated center of gravity curve 310 is shown according to the inventive concepts disclosed herein. In some embodiments, the system is configured to receive inputs from the pilot, such as a flight plan input regarding the event 300. For example, before takeoff the pilot of an aircraft establishes a flight plan that includes an inflight deployment of a vehicle. Using the center of gravity monitoring system 100, the pilot inputs the event 300 to indicate that the vehicle will be deployed at a particular waypoint and any other information regarding the deployment, such as the weight of the vehicle to be deployed, the location of the aircraft that the vehicle will be deployed from, and a specific cargo bay door or opening for the vehicle to be deployed from. As shown in FIG. 3, in response to the inputted event 300, the table 210 is updated to illustrate details regarding the inputted event 300. The processing circuit 102 determines how the inputted event 300 will affect the center of gravity of the aircraft and displays a new predicted center of gravity curve 310 to include the event 300.

In some embodiments, plotting the center of gravity curve 250 includes overlaying the center of gravity curve 250 on a center of gravity envelope of the aircraft, the center of gravity envelope based on at least one characteristic of the aircraft and specifying a recommended operational center of gravity limitation of the aircraft. The processing circuit 102 is configured to determine whether center of gravity of the aircraft exceeds a center of gravity threshold and to overlay the center of gravity curve 250 on the center of gravity envelope. In some embodiments, the center of gravity monitoring system 100 is configured to prompt (e.g., alert) the pilot in response to determining that the center of gravity of the aircraft exceeds the center of gravity threshold defined by the center of gravity envelope 240. In some embodiments, the prompt includes an indication for alerting the pilot that the center of gravity of the aircraft exceeds the center of gravity threshold. In some embodiments, the center of gravity monitoring system 100 is configured to indicate which center of gravity reference point or event causes the center of gravity of the aircraft to exceed the center of gravity threshold defined by the center of gravity envelope 240. In one embodiment, the center of gravity monitoring system 100 determines that the addition of the event 300 causes the center of gravity of the aircraft to exceed the center of gravity threshold defined by the center of gravity envelope 240. In response to determining that the specific event 300 causes the center of gravity of the aircraft to exceed the center of gravity threshold, the center of gravity monitoring system 100 highlights portions of the center of gravity curve 310 and the entries in the table 210 corresponding to the event 300. As shown in FIG. 3, the event 300 on the plot 202 and the icon 222 and the center of gravity location 226 in the table 210 are highlighted to indicate that the event 300 has caused or will cause the center of gravity of the aircraft to exceed the center of gravity threshold. In some embodiments, an alert (e.g., noise, light, verbal warning, haptic signal) may be relayed to the pilot to indicate that the event 300 has caused or will cause the center of gravity of the aircraft to exceed the center of gravity threshold. The pilot may be able to select the event 300 by interacting with the display 114 (e.g., via touchscreen or via the external input device 118). For example, the pilot may touch the display 114 at a location corresponding to a location of the event 300 on the plot 202 or the table 210.

Figure 4:
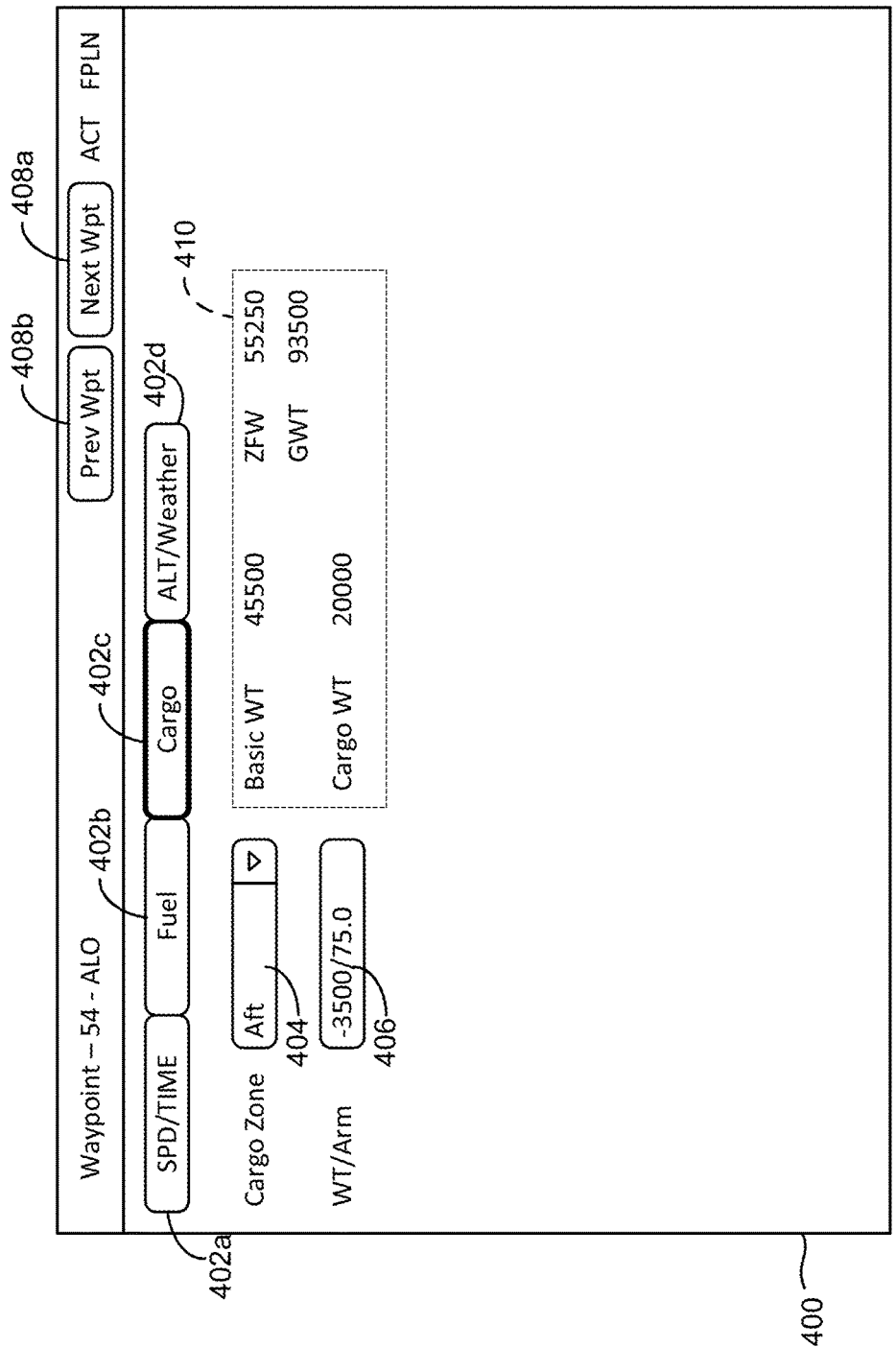
FIG. 4 is an illustration of another exemplary embodiment of a display screen of the center of gravity monitoring system of FIG. 1 having an event menu.

As shown in FIG. 4, in response to the pilot selecting the event 300, the center of gravity monitoring system 100 may be configured to prompt the pilot with an event menu 400 corresponding to the event 300. The event menu 400 includes at least one editable field. The event menu 400 provides the pilot with event characteristics corresponding to the event 300 and facilitates editing the event characteristics by the pilot via the editable fields, thereby replacing the original event characteristics with new event characteristics. For example, the pilot is able to correct inputted data regarding the event 300 due to the previously inputted data being incorrect or resulting in unsafe or not optimal operation of the aircraft due to center of gravity fluctuations. In some embodiments, when the pilot wishes to enter a new event, the display provides the event menu 400 and provides prompts that request the pilot to provide specific event characteristics in the editable fields. For example, if the event is to occur while the aircraft is airborne, the pilot may be prompted to enter a waypoint for the event to occur at and an amount of weight to be added or removed during the event. For example, as shown in FIG. 4, the event menu 400 includes tabs 402a-402d. The tabs 402a-402d may correspond with event characteristics related to speed, time, fuel, cargo, altitude, and expected weather at the time the event 300 is to occur.

A cargo tab 402c corresponds to cargo related event characteristics for the event 300 (e.g., for adding or removing cargo during a flight of the aircraft). For example, the cargo tab 402c may open a menu page including a zone indicator 404, a weight and arm indicator 406, and an information table 410. Following the previous example, where the event 300 corresponds to an inflight vehicle deployment, the zone indicator 404 may indicate which zone of the aircraft the vehicle is stored in and will be deployed from. For example, the aircraft may have an aft zone, a forward zone, a nose zone, a cockpit zone, a fuselage zone, a middle zone, a wing zone, a port zone, and a starboard zone. Each zone may be selectable via the zone indicator 404 and each zone may be characterized by an arm length (e.g., a distance from the zone to the center of gravity of the aircraft). Typically, a longer arm length indicates that removing or adding cargo to the zone will more greatly impact the center of gravity of the aircraft. The processor 110 may be configured to determine an ideal arrangement of cargo among various zones to maintain the center of gravity of the aircraft within the center of gravity threshold defined by the center of gravity envelope 240.

In some embodiments, the pilot may determine a different methodology or characteristic of the event 300. For example, the pilot may decide to deploy cargo at a different time or at a different waypoint than what is indicated by the flight plan to account for an updated flight plan or an indication that the current flight plan including the event 300 will result in the center of gravity of the aircraft exceeding the center of gravity threshold. The pilot may interact with the tab 402 to make changes to the current flight plan and details regarding the event 300. For example, the pilot may use a fuel tab 402*b* to change a fuel burn pattern for the aircraft in order to maintain the new predicted center of gravity curve 310 within the center of gravity envelope 240. For example, the fuel burn pattern may change the rate at which fuel is burned, the order of fuel tanks that fuel is burned from, transferring fuel between fuel tanks, and so on. In some scenarios, the pilot may change the order in which two events are to occur. For example, if a current flight plan includes a refueling event to occur prior to a cargo drop, the pilot may edit the flight plan to reorder the events such that the cargo drop occurs prior to refueling.

The event menu 400 may further include a previous waypoint button 408*a* and a next waypoint button 408*b*. The previous waypoint button 440*a* and the next waypoint button 440*b* enable the pilot to switch between various center of gravity reference points that correspond with either a next waypoint or a previous waypoint. The previous waypoint button 440*a* and the next waypoint button 440*b* enable the pilot to edit information relating to each of the center of gravity reference points to, for example, ensure that the center of gravity of the aircraft is maintained within the center of gravity threshold defined by the center of gravity envelope 240. The event menu 400 may include a current information table 410. The current information table 410 may display information regarding the center of gravity of the aircraft, such as a basic weight of the aircraft, a cargo weight to be added or dropped during the event, among other information.

Figure 5:
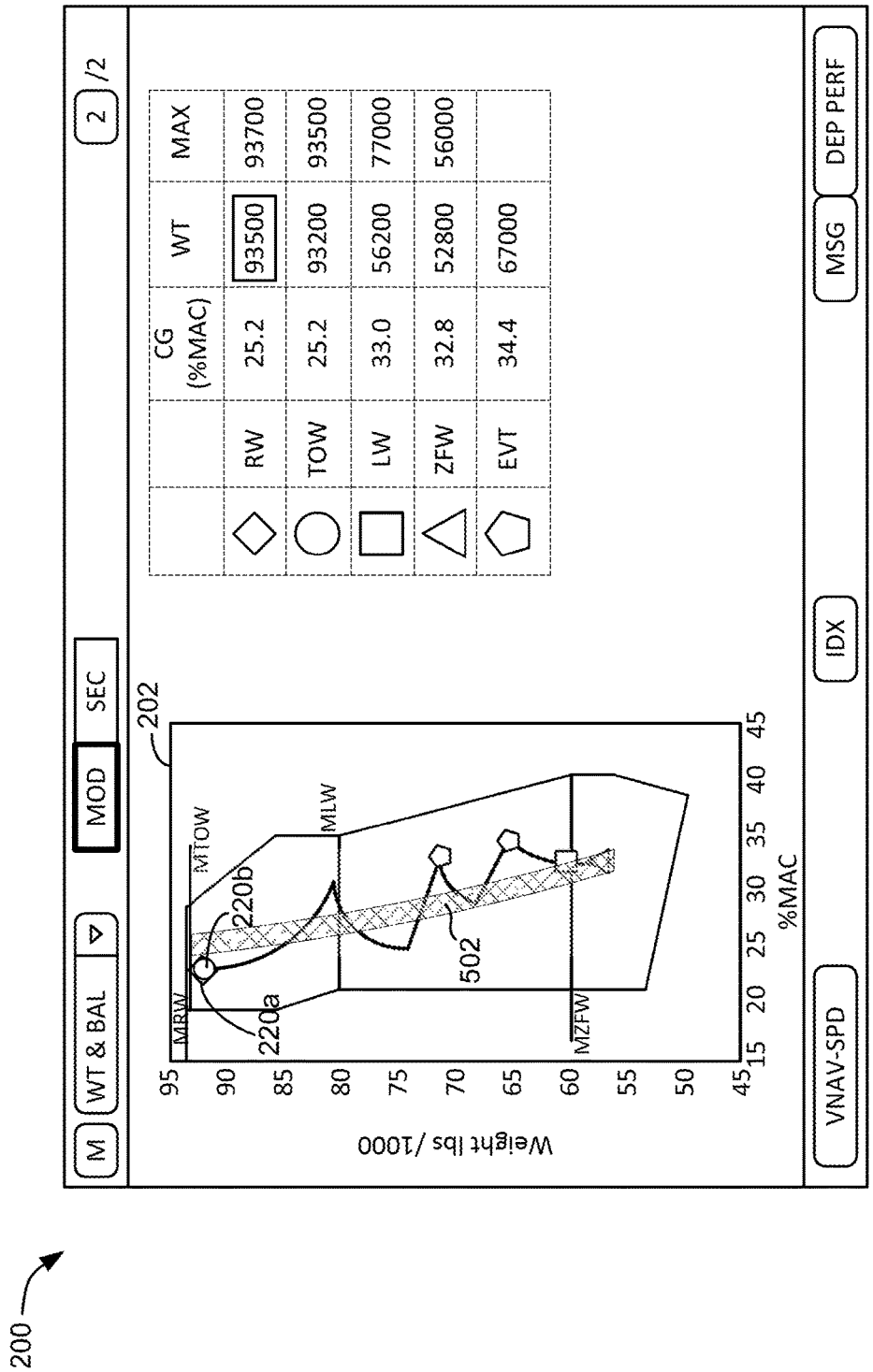
FIG. 5 is an illustration of another exemplary embodiment of a display screen of the center of gravity monitoring system of FIG. 1 having a fuel optimization zone.

Referring now to FIG. 5, an illustration of another exemplary embodiment of a display screen 200 of the center of gravity monitoring system 100 of FIG. 1 having a fuel optimization zone 502 is shown according to the inventive concepts disclosed herein. The fuel optimization zone 502 may be overlaid on the center of gravity curve 250 of the center of gravity plot 202 and indicates a center of gravity of the aircraft in which at least one of an optimal operation of the aircraft or optimal fuel efficiency of the aircraft is achieved. The fuel optimization zone 502 may be turned on and off by the pilot through a selection of a fuel economy indicator mode. For example, the pilot may select the fuel economy indicator mode on the display 114 via a button. According to various embodiments, the processing circuit is configured to compute the fuel optimization zone based on operational characteristics of the specific aircraft and an environmental characteristic as it will be appreciated that different aircraft perform differently in different weather conditions. The fuel optimization zone 502 may be used by the pilot of the aircraft as a target center of gravity for the aircraft when establishing a flight plan (e.g., the pilot may create or edit a flight plan in attempt to maintain the center of gravity of the aircraft within the fuel optimization zone as much as possible). In some embodiments, the processing circuit 102 of the center of gravity monitoring system 100 determines the fuel optimization zone 502 based on the center of gravity reference points. In some embodiments, the processing circuit 102 is configured to determine a fuel burn pattern for maintaining the center of gravity of the aircraft within the fuel optimization zone 502 and instruct the fuel management system to burn fuel according to the fuel burn pattern to improve fuel economy of the aircraft. The fuel burn pattern may include selecting a target burn pattern across multiple fuel tanks and burning fuel at different rates from each of the multiple fuel tanks.

Figure 6:
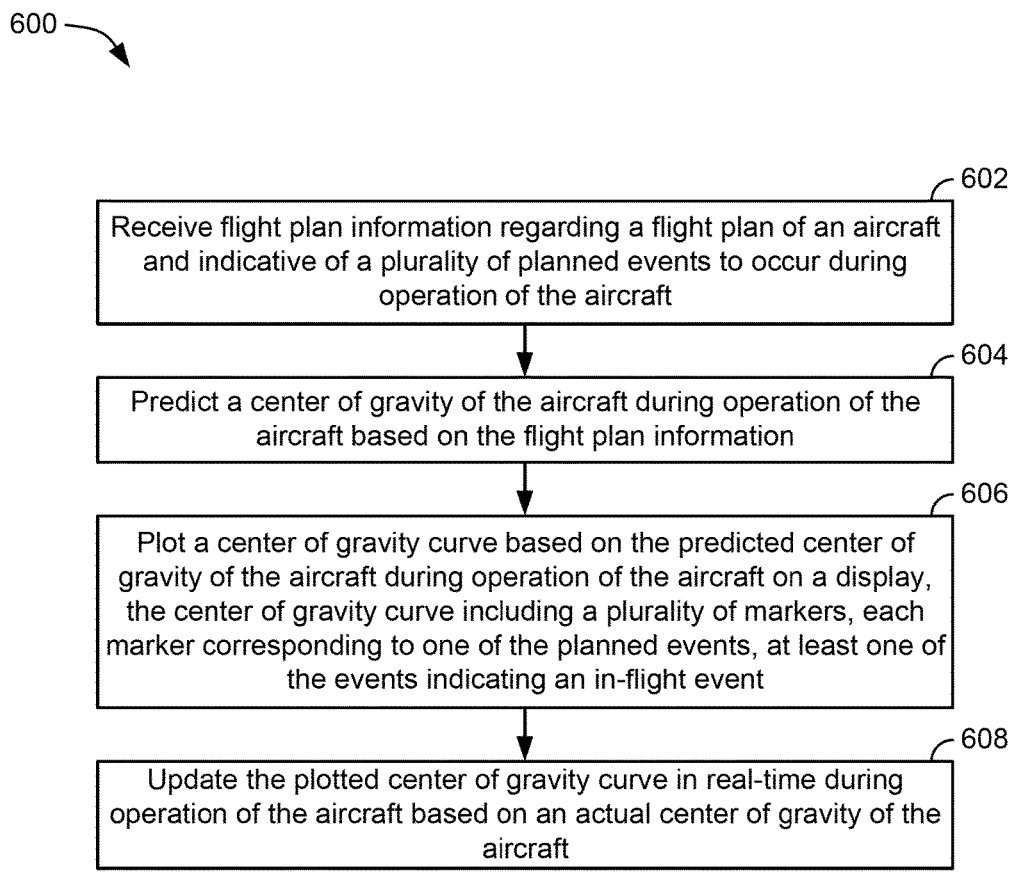
FIG. 6 is a flow diagram of an exemplary embodiment of a method for displaying a predicted center of gravity curve according to the inventive concepts disclosed herein.

Referring now to FIG. 6, an exemplary embodiment of a method 600 for monitoring the center of gravity of an aircraft according to the inventive concepts disclosed herein may include at least one of the following steps.

A step (602) may include receiving flight plan information regarding a flight plan of an aircraft. The flight plan information is indicative of a plurality of planned events to occur during operation of the aircraft. For example, the processing circuit 102 is configured to receive flight plan information regarding a planned inflight cargo drop or inflight refueling event and center of gravity data for the aircraft.

A step (604) may include predicting a center of gravity of the aircraft during operation of the aircraft based on the flight plan information. For example, the processing circuit 102 is configured to determine a predicted center of gravity of the aircraft during the upcoming planned course of operation of the aircraft.

A step (606) may include plotting a center of gravity curve based on the predicted center of gravity of the aircraft during operation of the aircraft on a display. The center of gravity curve includes a plurality of markers and each marker corresponds to one of the planned events. The location of each marker on the center of gravity curve indicates when during the flight the event is planned to occur. At least one of the events indicates an in-flight event. For example, the processing circuit 102 causes a plot of the center of gravity curve 250 to be provided on the display 114. The center of gravity curve includes a plurality of markers (e.g., center of gravity reference points 220*a*-220*f*). In another example, the processing circuit 102 plots the center of gravity curve by overlaying the center of gravity curve on a center of gravity envelope of the aircraft. The center of gravity envelope is based on at least one characteristic of the aircraft and specifies a recommended operational center of gravity limitation of the aircraft. At least one of the center of gravity events is planned to occur when the aircraft is airborne (e.g., a cargo parachute drop, a mid-air refueling, personnel deployment). However, it will be appreciated that the center of gravity monitoring system 100 does not require an inflight event to be planned or for an inflight event to occur for the system to be operational. In other words, the center of gravity monitoring system 100 is configured to monitor a center of gravity of the aircraft and to provide a center of gravity display based on the center of gravity of the aircraft regardless of the number of events and regardless of whether any inflight events are planned to occur or actually occur.

A step (606) may include updating the plotted center of gravity curve in real-time during operation of the aircraft based on an actual center of gravity of the aircraft. For example, the processor 110 receives sensor data from the sensor 112 including center of gravity data (e.g., BOW CG, cargo, fuel weights, and fuel arms) of the aircraft during the flight, and updates the plotted center of gravity curve based on the sensor data.

In some embodiments, the method for monitoring the center of gravity of an aircraft 600 may incorporate overlaying the fuel optimization zone 502 as described herein. For example, the method for monitoring the center of gravity of an aircraft 600 may further include determining an optimal center of gravity of the aircraft for optimizing fuel efficiency or a performance characteristic of the aircraft, and providing an indication of the optimal center of gravity of the aircraft on the display 114.

As will be appreciated from the above, event depiction on center of gravity curves according to embodiments of the inventive concepts disclosed herein may increase pilot and crew awareness by providing information regarding events, including inflight events that occur when the aircraft is airborne, that impact the center of gravity of an aircraft. Specifically, embodiments of the inventive concepts disclosed herein may facilitate simpler and faster correction of the predicted center of gravity curve of an aircraft by directing the pilot to a particular event that causes or will cause the center of gravity of the aircraft to exceed a center of gravity threshold defined by a center of gravity envelope such that the pilot understands and has the ability to adequately address the event before the aircraft exhibits undesirable flight characteristics. Accordingly, embodiments of the inventive concepts disclosed herein enable changing the predicted center of gravity curve to reflect an actual center of gravity of the aircraft affected by an inflight addition or deployment of cargo, personnel, munitions, and fuel.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried out in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. A system for monitoring center of gravity of a fixed wing aircraft, the system comprising:
at least one processor coupled with a non-transitory processor-readable medium storing processor-executable code for causing the at least one processor to:
receive, at a first time, flight plan information regarding a flight plan of a fixed wing aircraft, the flight plan information indicative of a plurality of planned events to occur during operation of the fixed wing aircraft;
predict a center of gravity of the fixed wing aircraft during operation of the fixed wing aircraft based on the flight plan information, the predicted center of gravity of the fixed wing aircraft associated with a second time occurring after the first time;
plot a center of gravity curve based on the predicted center of gravity of the fixed wing aircraft during operation of the fixed wing aircraft on a display, the center of gravity curve including a plurality of markers, each marker corresponding to one of the planned events, a location of each marker on the center of gravity curve indicating when during the flight plan the event is planned to occur, and at least one of the planned events indicating an in-flight event; and
update the plotted center of gravity curve in real-time during operation of the fixed wing aircraft based on an actual center of gravity of the fixed wing aircraft.

2. The system of claim 1, wherein plotting the center of gravity curve includes overlaying the center of gravity curve on a center of gravity envelope of the fixed wing aircraft, the center of gravity envelope based on at least one characteristic of the fixed wing aircraft and specifying a recommended operational center of gravity limitation of the fixed wing aircraft.

3. The system of claim 2, the processor-executable code further configured to cause the at least one processor to:
determine that the actual center of gravity of the fixed wing aircraft crosses beyond the center of gravity envelope; and
prompt a user, via the display, with an indication that the predicted center of gravity curve is outside bounds of the center of gravity envelope.

4. The system of claim 1, the processor-executable code further configured to cause the at least one processor to determine the actual center of gravity of the fixed wing aircraft based on sensor data received from a sensor onboard the fixed wing aircraft.

5. The system of claim 1, wherein the updated plotted center of gravity curve is continuously updated when the fixed wing aircraft is airborne.

6. The system of claim 1, wherein the in-flight event comprises at least one of a cargo drop, a fuel drop, a personnel drop, or an in-flight addition of at least one of cargo, fuel, and personnel.

7. The system of claim 1, wherein the markers are selectable, and where when one of the markers is selected, the processor-executable code further configured to cause the at least one processor to display event information relating to the planned event corresponding to the selected marker, the event information including a type of event, a location or time of the planned event, and an amount of weight to be added or subtracted from the fixed wing aircraft during the planned event.

8. The system of claim 7, the processor-executable code further configured to cause the at least one processor to edit the event information in response to receiving an input to edit the flight plan.

9. The system of claim 1, the processor-executable code further configured to cause the at least one processor to determine an optimal center of gravity of the fixed wing aircraft for optimizing fuel efficiency of the fixed wing aircraft, and to provide an indication of the optimal center of gravity of the fixed wing aircraft on the display.

10. A method comprising:
receiving flight plan information regarding a flight plan of a fixed wing aircraft, the flight plan information indicative of a plurality of planned events that have not occurred when the flight plan information is received but are planned to occur during operation of the fixed wing aircraft;
predicting a center of gravity of the fixed wing aircraft during operation of the fixed wing aircraft based on the flight plan information;
plotting a center of gravity curve based on the predicted center of gravity of the fixed wing aircraft during operation of the fixed wing aircraft on a display, the center of gravity curve including a plurality of markers, each marker corresponding to one of the planned events, a location of each marker on the center of gravity curve indicating when during the flight plan the event is planned to occur, and at least one of the planned events indicating an in-flight event; and updating the plotted center of gravity curve in real-time during operation of the fixed wing aircraft based on an actual center of gravity of the fixed wing aircraft.

11. The method of claim 10, wherein plotting the center of gravity curve includes overlaying the center of gravity curve on a center of gravity envelope of the fixed wing aircraft, the center of gravity envelope based on at least one characteristic of the fixed wing aircraft and specifying a recommended operational center of gravity limitation of the fixed wing aircraft.

12. The method of claim 10, further comprising determining the actual center of gravity of the fixed wing aircraft based on sensor data received from a sensor onboard the fixed wing aircraft.

13. The method of claim 10, wherein the in-flight event comprises at least one of a cargo drop, a fuel drop, a personnel drop, or an in-flight addition of at least one of cargo, fuel, and personnel.

14. The method of claim 10, wherein the markers are selectable, and where when one of the markers is selected, the processor-executable code further configured to cause at least one processor to display event information relating to the planned event corresponding to the selected marker, the event information including a type of event, a location or time of the planned event, and an amount of weight to be added or subtracted from the fixed wing aircraft during the planned event.

15. The method of claim 10, the processor-executable code further configured to cause at least one processor to determine an optimal center of gravity of the fixed wing aircraft for optimizing fuel efficiency of the fixed wing aircraft, and to provide an indication of the optimal center of gravity of the fixed wing aircraft on the display.

16. A system for monitoring center of gravity of a fixed wing aircraft, the system comprising:
at least one processor coupled with a non-transitory processor-readable medium storing processor-executable code for causing the at least one processor to:
receive flight plan information regarding a flight plan of a fixed wing aircraft, the flight plan information indicative of a plurality of planned events to occur during operation of the fixed wing aircraft;

determining a predicted center of gravity of the fixed wing aircraft based on the flight plan information, the fixed wing aircraft having an actual center of gravity at a time when the predicted center of gravity is determined, the predicted center of gravity being different from the actual center of gravity of the fixed wing aircraft at the time when the predicted center of gravity is determined; and plot a center of gravity curve based on the predicted center of gravity of the fixed wing aircraft during operation of the fixed wing aircraft on a display, the center of gravity curve including a plurality of markers, each marker corresponding to one of the planned events, a location of each marker on the center of gravity curve indicating when during the flight plan the event is planned to occur, and at least one of the planned events indicating an in-flight event;

wherein plotting the center of gravity curve includes overlaying the center of gravity curve on a center of gravity envelope of the fixed wing aircraft, the center of gravity envelope based on at least one characteristic of the fixed wing aircraft and specifying a recommended operational center of gravity limitation of the fixed wing aircraft.

17. The system of claim 16, wherein the in-flight event comprises at least one of a cargo drop, a fuel drop, a personnel drop, or an in-flight addition of at least one of cargo, fuel, and personnel.

18. The system of claim 16, wherein the markers are selectable, and where when one of the markers is selected, the processor-executable code further configured to cause the at least one processor to display event information relating to the planned event corresponding to the selected marker, the event information including a type of event, a location or time of the planned event, and an amount of weight to be added or subtracted from the fixed wing aircraft during the planned event.

19. The system of claim 18, the processor-executable code further configured to cause the at least one processor to edit the event information in response to receiving an input to edit the flight plan.

20. The system of claim 16, the processor-executable code further configured to cause the at least one processor to determine an optimal center of gravity of the fixed wing aircraft for optimizing fuel efficiency of the fixed wing aircraft, and to provide an indication of the optimal center of gravity of the fixed wing aircraft on the display.

* * * * *